US010778915B2

(12) United States Patent
Wang et al.

(10) Patent No.: US 10,778,915 B2
(45) Date of Patent: *Sep. 15, 2020

(54) DUAL-APERTURE RANGING SYSTEM

(71) Applicant: PixArt Imaging Inc., Hsin-Chu County (TW)

(72) Inventors: Guo-Zhen Wang, Hsin-Chu County (TW); Yi-Lei Chen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,881

(22) Filed: Jun. 10, 2019

(65) Prior Publication Data
US 2019/0297279 A1 Sep. 26, 2019

Related U.S. Application Data

(63) Continuation of application No. 15/252,671, filed on Aug. 31, 2016, now Pat. No. 10,368,014.

(30) Foreign Application Priority Data

Oct. 22, 2015 (TW) ............................. 104134744 A (51) Int. Cl.
*H04N 5/33* (2006.01)
*H04N 5/357* (2011.01)
(Continued)

(52) U.S. Cl.
CPC ............. *H04N 5/332* (2013.01); *G06T 7/571* (2017.01); *H04N 5/2254* (2013.01); *H04N 5/2257* (2013.01); *H04N 5/3572* (2013.01); *G06T 2207/10024* (2013.01); *G06T 2207/10048* (2013.01)

(58) Field of Classification Search
None
See application file for complete search history.

(56) References Cited

U.S. PATENT DOCUMENTS 6,211,521 B1 * 4/2001 Bawolek ................ G02B 5/201
250/208.1
9,736,437 B2 * 8/2017 Kaiser ................... G06T 3/4015
(Continued)

OTHER PUBLICATIONS

Search Report IP.com.*

*Primary Examiner* — Mohammad J Rahman
(74) *Attorney, Agent, or Firm* — Hauptman Ham, LLP (57) ABSTRACT

A ranging system including a first aperture stop, a second aperture stop, an image sensor and a processing unit is provided. The first aperture stop includes a sheet of IR-cut filter material. The second aperture stop includes a sheet of opaque material. The image sensor receives light passing through the first and second aperture stops to output an image frame. The processing unit respectively calculates a convolution between a first color subframe of the image frame and a plurality of first blur kernels to generate a plurality of blurred first frames, respectively calculates a convolution between a second color subframe of the image frame and a plurality of second blur kernels to generate a plurality of blurred second frames, and performs a best matching between the blurred first frames and the blurred second frames.

20 Claims, 5 Drawing Sheets

(51) Int. Cl.
*H04N 5/225* (2006.01)
*G06T 7/571* (2017.01)

(56) References Cited

U.S. PATENT DOCUMENTS

| | | | | |
|---|---|---|---|---|
| 9,872,012 | B2* | 1/2018 | Paramonov | H04N 5/332 |
| 10,181,488 | B2* | 1/2019 | Gomi | H04N 9/07 |
| 10,341,585 | B2* | 7/2019 | Yun | G03B 11/00 |
| 2002/0022768 | A1* | 2/2002 | Utsui | A61B 1/05 |
| | | | | 600/178 |
| 2009/0159799 | A1* | 6/2009 | Copeland | G01J 3/51 |
| | | | | 250/338.1 |
| 2016/0181295 | A1* | 6/2016 | Wan | G01S 7/4914 |
| | | | | 348/164 |
| 2016/0181298 | A1* | 6/2016 | Wan | H01L 27/1465 |
| | | | | 348/164 |
| 2017/0148831 | A1* | 5/2017 | Choi | H01L 27/14627 |

* cited by examiner

DUAL-APERTURE RANGING SYSTEM

CROSS REFERENCE TO RELATED APPLICATION

This application is a continuation application of U.S. Ser. No. 15/252,671, filed on Aug. 31, 2016, which claims the priority benefit of Taiwan Patent Application Serial Number 104134744, filed on Oct. 22, 2015, the full disclosures of which are incorporated herein by reference.

BACKGROUND

1. Field of the Disclosure

This disclosure generally relates to an optical system, more particularly, to a dual-aperture ranging system.

2. Description of the Related Art

The image system has become one of indispensable application systems on current portable devices. In addition to recording images, signals captured by the image system are also applicable to the gesture recognition, proximity sensing or distance measuring.

In the application of the distance measuring, it is possible to calculate a depth by the method of, for example, time of flight, structure light, light field camera and aperture coded camera, etc.

However, the methods mentioned above all have their limitations. For example, the time of flight and the structure light consume higher power, and thus they are not suitable to portable devices. The light field camera can lower the image resolution. The aperture coded camera has a lower signal-to-noise ratio.

Accordingly, it is necessary to provide a scheme to solve the above problems.

SUMMARY

The present disclosure is to provide a dual-aperture ranging system which compares a convolution of green light images and a plurality of blur kernels with a convolution of infrared light images (IR image) and a plurality of blur kernels to generate a depth map.

The present disclosure is further to provide a dual-aperture ranging system which compares a convolution of blue light images and a plurality of blur kernels with a convolution of infrared light images (IR image) and a plurality of blur kernels to generate a depth map.

To achieve the objects mentioned above, the present disclosure provides a ranging system including a transparent plate and a pixel array. The transparent plate is coated with an IR-cut filter layer having a first diaphragm aperture and a light-shielding layer having a second diaphragm aperture, wherein the second diaphragm aperture is larger than the first diaphragm aperture. The pixel array is composed of IR pixels and green pixels without having any red pixel, or composed of IR pixels and blue pixels without having any red pixel. The pixel array is configured to receive light passing through the transparent plate.

The present disclosure further provides a ranging system including a light source, a transparent plate, an image sensor and a processor. The transparent plate is coated with an IR-cut filter layer having a first diaphragm aperture and a light-shielding layer having a second diaphragm aperture, wherein the second diaphragm aperture is larger than the first diaphragm aperture. The image sensor includes a pixel array composed of IR pixels and green pixels without having any red pixel, or composed of IR pixels and blue pixels without having any red pixel. The image sensor is configured to receive light passing through the transparent plate, output a first image frame corresponding to the light source being turned on and output a second image frame corresponding to the light source being turned off. The processor is configured to calculate a differential image frame between the first image frame and the second image frame, divide the differential image frame into a first color subframe and a second color subframe; respectively calculate a convolution of the first color subframe and a plurality of first blur kernels to generate a plurality of blurred first subframes; respectively calculate a convolution of the second color subframe and a plurality of second blur kernels to generate a plurality of blurred second subframes; and perform a best matching between the blurred first subframes and the blurred second subframes to obtain a set of best matching subframes.

The present disclosure further provides an operating method of a ranging system. The ranging system includes a transparent plate and an image sensor sequentially arranged in a longitudinal direction. The transparent plate is coated with an IR-cut filter layer having a first diaphragm aperture and a light-shielding layer having a second diaphragm aperture larger than the first diaphragm aperture. The operating method includes the steps of: receiving, by the image sensor comprising a pixel array composed of IR pixels and green pixels without having any red pixel, or composed of IR pixels and blue pixels without having any red pixel, light passing through the transparent plate to generate an image frame; calculating a convolution of a first color subframe of the image frame respectively with a plurality of first blur kernels to generate a plurality of blurred first subframes; calculating a convolution of a second color subframe of the image frame respectively with a plurality of second blur kernels to generate a plurality of blurred second subframes; performing a best matching between the blurred first subframes and the blurred second subframes to obtain a set of best matching subframes; and obtaining a depth according to the set of best matching subframes.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
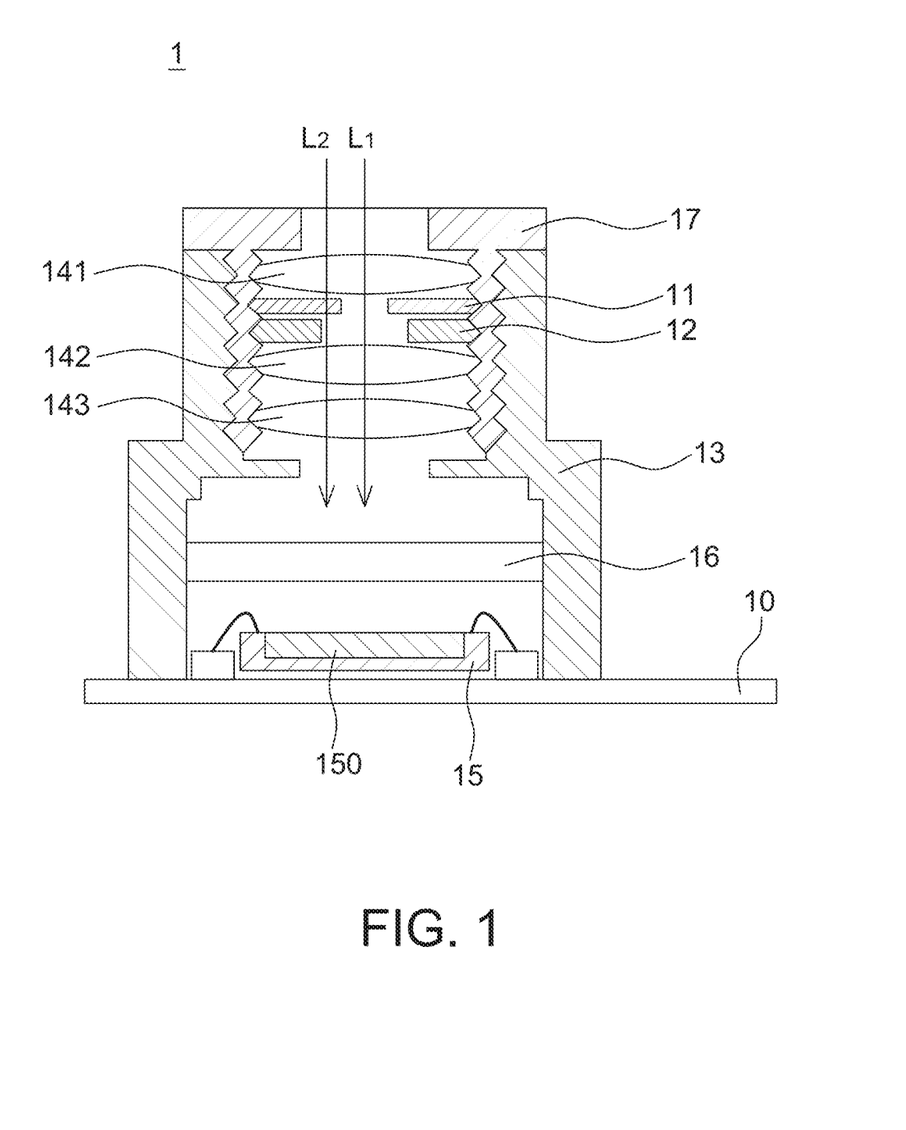
FIG. 1 is a cross-sectional view of a dual-aperture ranging system according to one embodiment of the present disclosure.

Please referring to FIG. 1, it is a cross-sectional view of a dual-aperture ranging system according to one embodiment of the present disclosure. A ranging system 1 of this embodiment includes a substrate 10, a first aperture stop 11, a second aperture stop 12, a lens holder 13, a lens set (for example, three lenses 141 to 143 being shown herein, but not limited to), an image sensor 15, an IR-cut filter (infrared-cut filter) 16 and a lens barrier 17.

The lens holder 13 substantially has, for example, a cylinder structure, and the lenses 141 to 143, the first aperture stop 11 and the second aperture stop 12 are arranged inside the lens holder 13, wherein a number and type (for example, convex lens or concave lens) of the lenses included in the lens set shown in FIG. 1 are only intended to illustrate, and the number and type of the lenses are determined according to different applications without particular limitations. The lens barrier 17 is configured to protect the lens set arranged inside the lens holder 13 and has an opening to allow external light to enter the lens holder 13 and reach the image sensor 15 in the lens holder 13 via the opening.

The first aperture stop 11 includes a sheet made of IR-cut material and has a first diaphragm aperture, wherein the sheet has, for example, a ring shape and is used to block infrared light. To be more precisely, the first diaphragm aperture is an opening of the sheet and located substantially at a center of the sheet, but not limited thereto. The first diaphragm aperture is substantially a circular opening, but not limited thereto. In one embodiment, a cutoff wavelength of IR-cut material is between 550 nm and 650 nm to block a light beam (for example L2) having a wavelength longer than the cutoff wavelength from penetrating the sheet, wherein the cutoff wavelength is determined according to a visible spectrum to be received by the image sensor 15. Please referring to FIG. 2, it is the spectral response corresponding to different light colors. For example, when the image sensor 15 is mainly used to sense blue light, the cutoff wavelength is selected to be shorter (e.g., 550 nm); whereas, when the image sensor 15 is mainly used to sense green light, the cutoff wavelength is selected to be longer (e.g., 650 nm) to eliminate the interference from infrared light.

Figure 2:
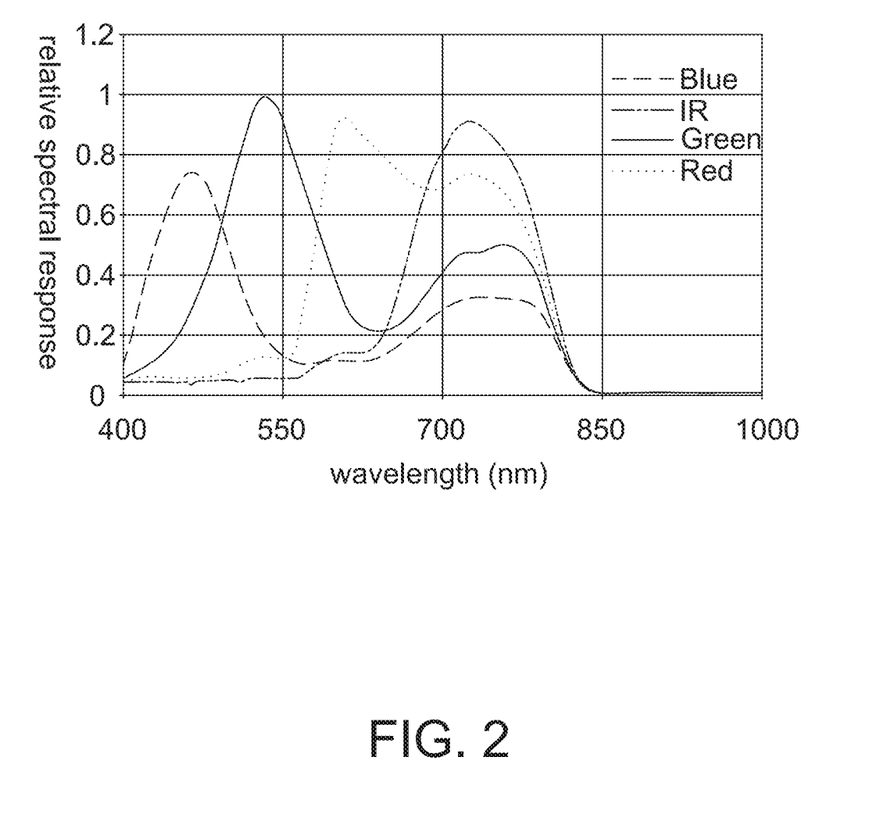
FIG. 2 is the spectral response corresponding to different light colors.

The second aperture stop 12 includes a sheet made of opaque material and has a second diaphragm aperture, wherein the sheet has, for example, a ring shape and is configured to block all light colors (e.g., blocking all spectrums shown in FIG. 2). To be more precisely, the second diaphragm aperture is an opening of the sheet, and located substantially at a center of the sheet, but not limited thereto. The second diaphragm aperture is substantially a circular opening, but not limited thereto.

In this embodiment, the second diaphragm aperture is larger than the first diaphragm aperture so as to form a dual-aperture structure. In such arrangement, an aperture through which infrared light passes is different from an aperture through which green/blue light passes. For example in FIG. 1, a light beam L1 includes components of red, green, blue and infrared light, and a light beam L2 mainly includes components of green and blue light but does not include infrared light component (blocked by the first aperture stop 11) or includes the infrared light component much lower than the components of green/blue light.

Therefore, an effective aperture of the infrared light is the first diaphragm aperture, but an effective aperture of the green light and the blue light is the second diaphragm aperture. As shown in FIG. 2, as the overlapped range of spectrums of red light and IR light is higher, in the present disclosure the image sensor 15 is arranged not to sense the spectrum energy of red light to reduce the interference from IR light.

It is appreciated that although FIG. 1 shows that the second aperture stop 12 is closer to the image sensor 15 than the first aperture stop 11, it is only intended to illustrate but not to limit the present disclosure. In one embodiment, locations of the first aperture stop 11 and the second aperture stop 12 are exchangeable. In another embodiment, the first aperture stop 11 and the second aperture stop 12 are formed on a same transparent plate, and the first diaphragm aperture and the second diaphragm aperture are formed by forming (e.g., coating) different light-shielding layer (e.g., used as the second aperture stop 12) and filter layer (e.g., used as the first aperture stop 11) on the transparent plate.

The image sensor 15 and the lens holder 13 are arranged on the substrate 10. The lens holder 13 is assembled to the substrate 10 by an appropriate way, e.g., engaged to or adhered to the substrate 10, without particular limitations. The image sensor 15 is attached to the subtract 10 using a suitable way without particular limitations as long as the image sensor 15 is electrically coupled to the substrate 10 for signal transmission. For example, FIG. 1 shows that the image sensor 15 is electrically coupled to the substrate 10 by wire bonding, but not limited thereto. One end of the lens holder 13 (e.g. an end closing to the substrate 10 in FIG. 1) has an accommodation space therein, and the image sensor 15 and pixel array 150 thereof are arranged inside the accommodation space.

The image sensor 15 is, for example, an image sensing chip which preferably includes an active image sensing device, e.g., COMS sensor, but not limited thereto. The image sensor 15 receives, at a frame rate, light passing through the first aperture stop 11 and the second aperture stop 12, and outputs an image frame.

Figure 3A:
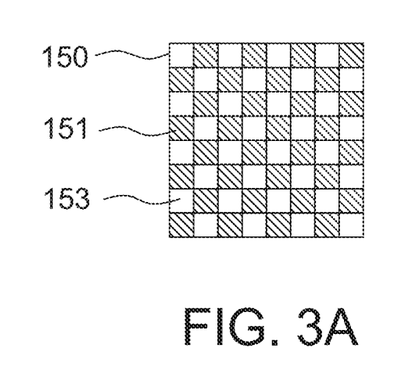
FIGS. 3A and 3B are schematic diagrams of pixel arrangements of a pixel array according to some embodiments of the present disclosure.
Figure 3B:
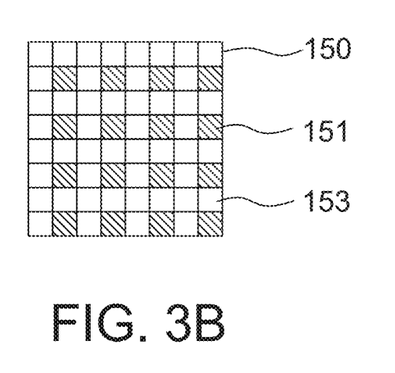

Please referring to FIGS. 3A and 3B, they are schematic diagrams of pixel arrangements of a pixel array 150 according to some embodiments of the present disclosure. The image sensor 15 includes a pixel array 150, which has a plurality of pixels arranged in a matrix, configured to receive light passing through the lens set, the first aperture stop 11 and the second aperture stop 12, and output an image frame, wherein a size of the pixel array 150 does not have particular limitations.

In this embodiment, the pixel array 150 is composed of a plurality of first color pixels 151 and a plurality of second color pixels 153. For example, the first color is green light or blue light, and the second light is IR (infrared) light. In the present disclosure, the first color pixels 151 exclude red pixels to reduce the interference from IR light. Therefore, the first color pixel 151 is only selected from one of the green pixel and the blue pixel. It is appreciated that different color pixels have the same circuit structure, but only different color filters are formed thereon to allow light sensing elements (e.g. photodiodes) therein to sense light energy of different colors of light.

Figure 4A:
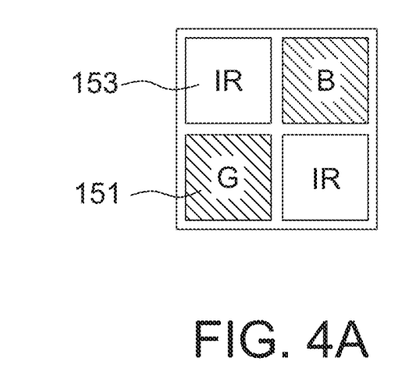
FIGS. 4A and 4B are schematic diagrams of pixel arrangements of a pixel array according to other embodiments of the present disclosure.
Figure 4B:
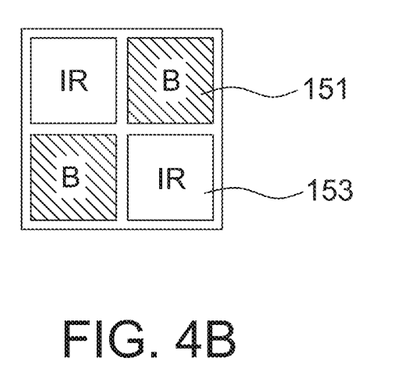

In the pixel array 150, the first color pixels 151 and the second color pixels 153 are preferably arranged as a chessboard pattern to facilitate the followed interpolation operation. Please referring to FIGS. 4A and 4B, the first color pixels 151 are arranged in a diagonal direction and respectively adjacent to the second color pixels 153.

It should be mentioned that the first color pixels 151 and the second color pixels 153 herein do not include dummy pixels of the pixel array 150. In some embodiments, it is possible to arrange dummy pixels at edge rows of the pixel array 150 used as means for eliminating noises.

The IR-cut filter 16 is arranged above the pixel array 150 of the image sensor 15 and has a cutoff wavelength of about 810 nm. It is appreciated that the cutoff wavelength is determined according to a target spectrum to be sensed by the second color pixels 153, and is not limited to 810 nm. Furthermore, although FIG. 1 shows that the IR-cut filter 16 is arranged on the lens holder 13, the present disclosure is not limited thereto. In other embodiments, the IR-cut filter 16 is an IR-cut layer directly coated on the pixel array 150 of the image sensor 15 as long as infrared light having long wavelength can be blocked from reaching the pixel array 150 of the image sensor 15.

As mentioned above, the image sensor 15 is an image sensing chip, and includes the pixel array 150 and a processor, wherein the processor directly post-processes pixel data (e.g., digital gray values) captured by the pixel array 150.

Figure 5:
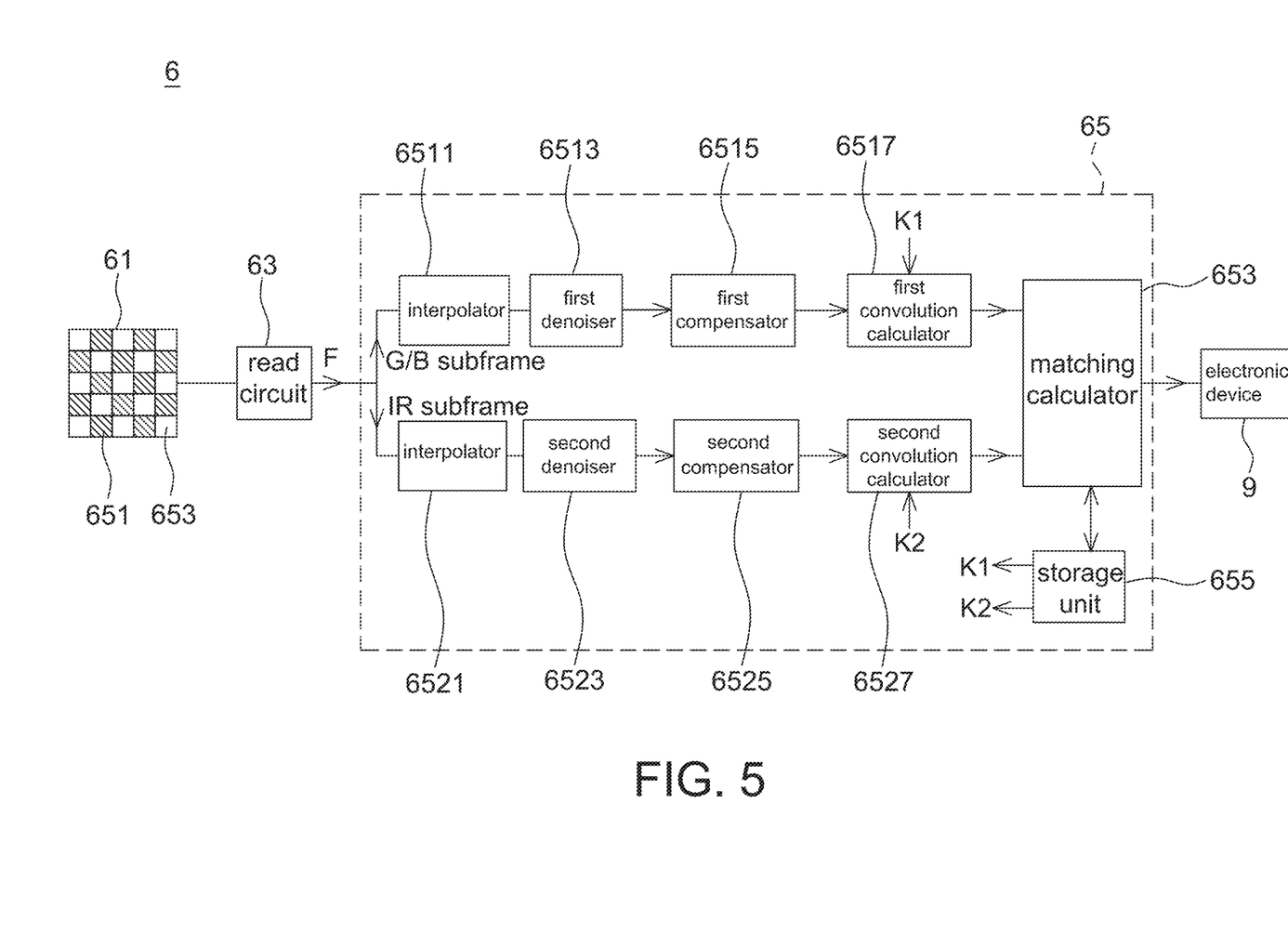
FIG. 5 is a schematic block diagram of a ranging system according to one embodiment of the present disclosure.

Please referring to FIG. 5, it is a block diagram of a ranging system according to one embodiment of the present disclosure. A ranging system 6 in this embodiment includes a pixel array 61, a read circuit 63 and a processor 65. The pixel array 61 is the above pixel array 150 (as FIGS. 3A and 3B) and includes a plurality of first color pixels 651 and a plurality of second color pixels 653. The read circuit 63 sequentially reads gray values (pixel data) of every pixel of the pixel array 61 according to a timing signal (e.g., generated by a timing controller), e.g., reading the pixel data by correlated double sampling, but not limited thereto. The processor 65 is, for example, a digital signal processor (DSP), and configured to calculate and output depth information (e.g. a depth map) according to the read pixel data to be outputted to an external electronic device 9 for corresponding controls, wherein the electronic device 9 is, for example, a portable electronic device or a wearable electronic device. The processor 65 includes, for example, an analog-to-digital converter to perform the digital conversion.

The processor 65 receives pixel data of an image frame F outputted by the read circuit 63, and respectively processes pixel data of first color pixels and pixel data of second color pixels. For example, the processor 65 forms pixel data of a plurality of first color pixels as a first color subframe and forms pixel data a plurality of second color pixels as a second color subframe, wherein said pixel data is digital converted pixel data. As mentioned above, the first color is green light or blue light, and the second color is infrared light. For example, FIG. 5 shows that the first color subframe is a green/blue subframe (G/B subframe) and the second color subframe is an IR subframe.

The processor 65 includes a first interpolator 6511, a second interpolator 6521, a first denoiser 6513, a second denoiser 6523, a first compensator 6515, a second compensator 6525, a first convolution calculator 6517, a second convolution calculator 6527, a matching calculator 653 and a storage unit 655. It should be mentioned that, although FIG. 5 shows the first interpolator 6511, the second interpolator 6521, the first denoiser 6513, the second denoiser 6523, the first compensator 6515, the second compensator 6525, the first convolution calculator 6517, the second convolution calculator 6527 and the matching calculator 653 by different function blocks, all the function blocks are considered to be executed by the processor 65, and the function blocks are implemented by hardware and/or software without particular limitations.

Figure 6:
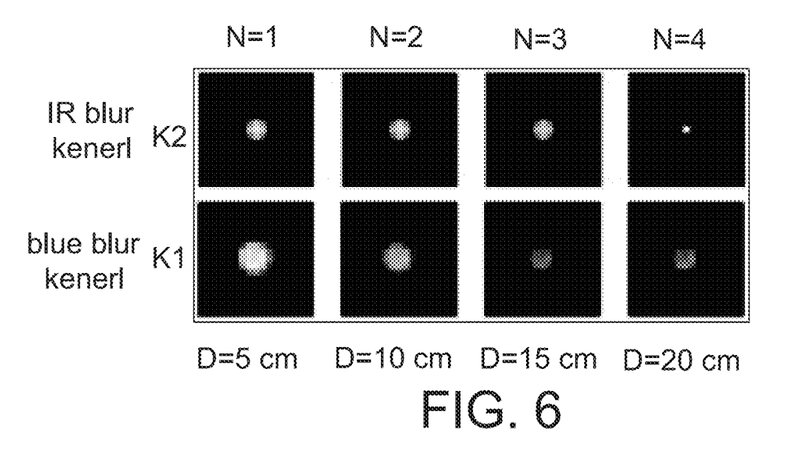
FIG. 6 is a schematic diagram of blur kernels applied to a ranging system according to one embodiment of the present disclosure.

The storage unit 655 is, for example, a memory or a buffer, and configured to previously store a plurality of first blur kernels, a plurality of second blur kernels, and depth information correlated to the first blur kernels and the second blur kernels. For example referring to FIG. 6, it is a schematic diagram of blur kernels applied to a ranging system according to one embodiment of the present disclosure. The storage unit 655 pre-stores blue blur kernels K1 corresponding to different distances, e.g., N1 (N=1) to N4 (N=4), and pre-stores IR blur kernels K2 corresponding to different distances, e.g., N1 to N4. Each blur kernel N1 to N4 is, for example, previously measured and stored by the ranging system 1 using a monochromatic light (e.g., blue light and IR) arranged at different distances. For example, the blur kernels N1 correspond to an object distance of 5 cm, the blur kernels N2 correspond to an object distance of 10 cm, the blur kernels N3 correspond to an object distance of 15 cm, and the blur kernels N4 correspond to an object distance of 20 cm. It is appreciated that a number and corresponding distances of the blur kernels K1 and K2 shown in FIG. 6 are only intended to illustrate but not to limit the present disclosure. In addition, it is possible to pre-store green blur kernels using the same way mentioned above.

The read circuit 63 sequentially reads every pixel data of the pixel array 61, e.g., sequentially reading from a first row of a first column to a last row of a last column, and outputs the read pixel data to the processor 65. The processor 65 divides an image frame F (e.g., including pixel data of first color pixels and pixel data of second color pixels) outputted by the pixel array 61 into a first color subframe and a second color subframe, e.g., forming pixel data corresponding to the first color pixels 651 as the first color subframe and forming pixel data corresponding to the second color pixels 652 as the second color subframe.

As the first color pixels 651 are only a part of pixels of the pixel array 61, the first interpolator 6511 of the processor 65 performs an interpolation on the image frame F (i.e. pixel data associated with the first color pixels 651) to generate a first color subframe to allow the first color subframe has a same size as valid pixels (e.g., not including dummy pixels) of the pixel array 61. For example, pixel data located at position (1, 1) is obtainable by interpolating pixel data of positions (1, 2) and (2, 1), and pixel data located at position (1, 3) is obtainable by interpolating pixel data of positions (1, 2), (2, 3) and (1, 4), and so on. However, the interpolation is not limited to those given herein.

As the second color pixels 653 are only a part of pixels of the pixel array 61, the second interpolator 6521 of the processor 65 performs an interpolation on the image frame F (i.e. pixel data associated with the second color pixels 653) to generate a second color subframe to allow the second color subframe has a same size as valid pixels of the pixel array 61. For example, pixel data located at position (1, 2) is obtainable by interpolating pixel data of positions (1, 1), (2, 2) and (1, 3), and pixel data located at position (1, 4) is obtainable by interpolating pixel data of positions (1, 3), (2, 4) and (1, 5), and so on. However, the interpolation is not limited to those given herein.

The first denoiser 6513 of the processor 65 filters (or performs denoising) the first color subframe, e.g., by a digital filter, to enhance the image quality. Similarly, the second denoiser 6513 of the processor 65 filters (or performs denoising) the second color subframe, e.g., by a digital filter. The digital filter is selected from conventional filters for processing images without particular limitations.

The first compensator 6515 of the processor 65 is configured to perform the lens shading compensation on the first color subframe, and the second compensator 6525 of the processor 65 is configured to perform the lens shading compensation on the second color subframe. Information of the lens shading compensation is previously stored in the processor 65 according to the adopted lenses 141 to 143 (referring to FIG. 1), e.g., storing in the storage unit 655.

In this embodiment, the processor 65 selects to perform at least one of the filtering (denoising) and lens shading compensation to improve the accuracy of calculating distances.

The first convolution calculator 6517 of the processor 655 calculates a convolution of a first color subframe (e.g., denoised and compensated first color subframe) of the image frame F respectively with a plurality of first blur kernels to generate a plurality of blurred first subframes. For example referring to FIG. 6, the first convolution calculator 6517 sequentially reads blue blur kernels K1 (e.g. N=1 to 4) from the storage unit 655, and respectively calculates the convolution of the first color subframe and blue blur kernels N=1 to 4 to generate a plurality of (e.g., 4 being shown herein) blurred first subframes. It is appreciated that a number of the generated blurred first subframes is the same as a number of pre-stored blur kernels K1.

The second convolution calculator 6527 of the processor 655 calculates a convolution of a second color subframe (e.g., denoised and compensated second color subframe) of the image frame F respectively with a plurality of second blur kernels to generate a plurality of blurred second subframes. For example referring to FIG. 6, the second convolution calculator 6527 sequentially reads IR blur kernels K2 (e.g. N=1 to 4) from the storage unit 655, and respectively calculates the convolution of the second color subframe and IR blur kernels N=1 to 4 to generate a plurality of blurred second subframes. It is appreciated that a number of the generated blurred second subframes is the same as a number of pre-stored blur kernels K2, e.g., 4 being shown in this embodiment.

The matching calculator 653 of the processor 65 then compares each of the blurred first subframes with the corresponding blurred second subframe to obtain a set of best matching subframes. In one embodiment, comparing the blurred first subframes and the blurred second subframes refers to perform a best matching between the blurred first subframes and the blurred second subframes. For example, the matching calculator 653 performs a subtraction on the blurred first subframe and the blurred second subframe corresponding to the blur kernel N1, e.g., subtracting pixel data of corresponding pixels, pixel-by-pixel, in the blurred first subframe and the blurred second subframe corresponding to the blur kernel N1 to obtain a first differential frame to be stored in the storage unit 655; performs a subtraction on the blurred first subframe and the blurred second subframe corresponding to the blur kernel N2 to obtain a second differential frame to be stored in the storage unit 655; performs a subtraction on the blurred first subframe and the blurred second subframe corresponding to the blur kernel N3 to obtain a third differential frame to be stored in the storage unit 655; and performs a subtraction on the blurred first subframe and the blurred second subframe corresponding to the blur kernel N4 to obtain a fourth differential frame to be stored in the storage unit 655. The matching calculator 653 selects a pair of blurred first subframe and blurred second subframe, which are associated with one of the first differential frame to the fourth differential frame having the smallest sum of all pixel gray values, as a set of best matching subframes.

In this embodiment, the first color subframe, the second color subframe, the blue blur kernels K1, the IR blur kernels K2, the blurred first subframes, the blurred second subframes, and the first differential frame to the fourth differential frame have a same size.

The matching calculator 653 determines a depth according to the depth information related to the first blur kernel and/or the second blur kernel corresponding to the set of best matching subframes. For example, when the set of best matching subframes corresponds to the blur kernel N=1 (i.e. the blurred first subframe and the blurred second subframe corresponding to the blur kernel N1), as mentioned above the depth information related to the blur kernel N=1 is, e.g., 5 cm, and thus the determined depth is 5 cm. Similarly, when the set of best matching subframes corresponds to N=2 to 4, a related depth D is then determined.

In addition, the best matching is not limited to calculating the subtraction of the blurred first subframes and the blurred second subframes. In other embodiments, the best matching is performed by calculating a correlation between each of the blurred first subframes and the corresponding blurred second subframe or using other conventional methods, and not limited to those given in the present disclosure. As mentioned above, the corresponding blurred second subframe is referred to a blurred second subframe corresponding to the blur kernel N=1 to 4 at the same object distance. The above calculating the differential frame is only intended to illustrate but not to limit the present disclosure. A set of best matching subframes is referred to a set of blurred first subframe and blurred second subframe having highest similarity.

In some embodiments, when a difference between the similarity (e.g. the above sum of pixel gray values of the differential frame) of two sets of blurred first subframes and blurred second subframes is not obvious, it is able to calculate a depth by differential. For example, when the similarity is between N=1 and N=2, the depth D is determined to be 7.5 cm.

At last, the processor 65 outputs the determined depth D to the external electronic device 9.

Figure 7:
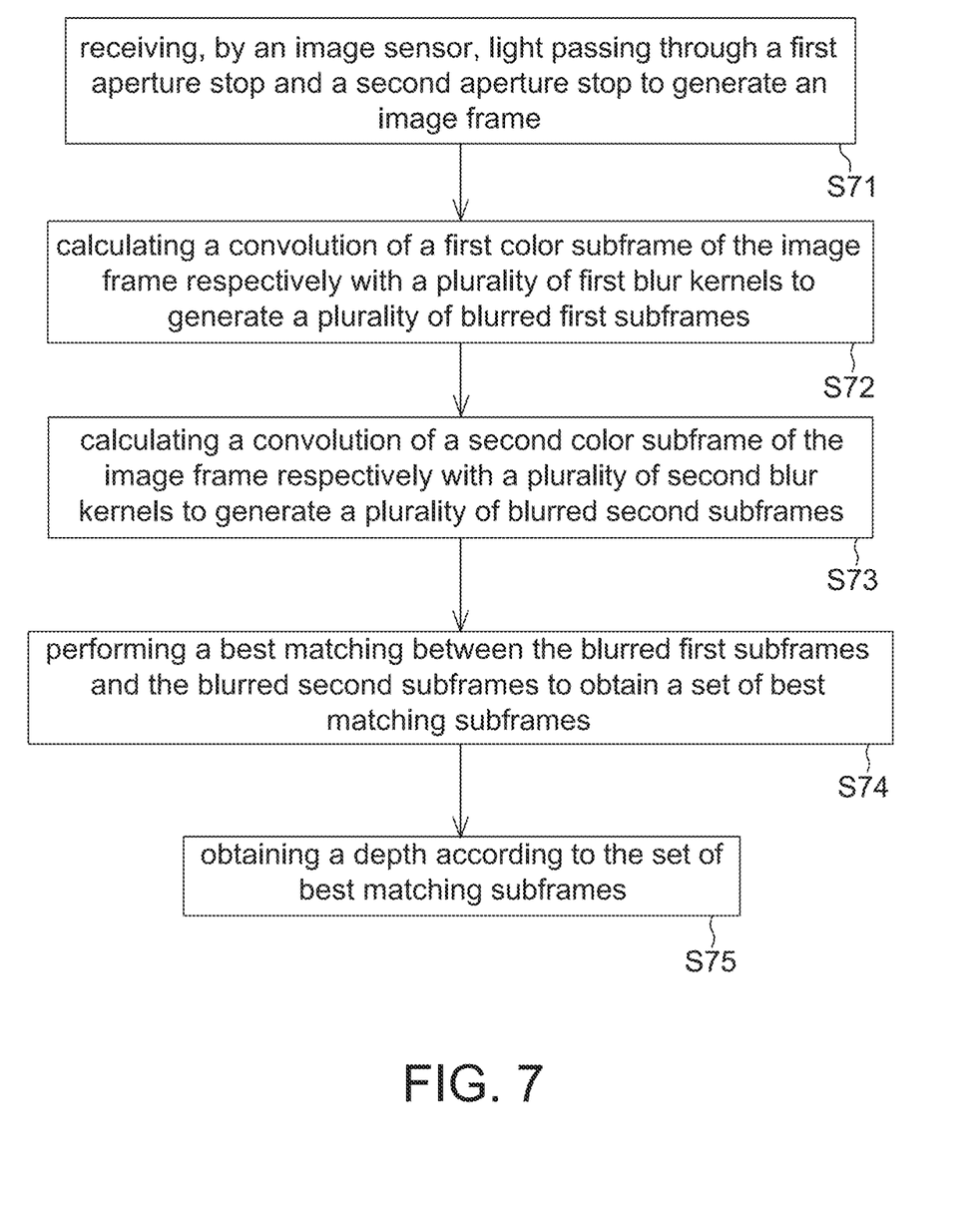
FIG. 7 is a flow chart of an operating method of a ranging system according to one embodiment of the present disclosure.

Please referring to FIG. 7, it is a flow chart of an operating method of a ranging system according to one embodiment of the present disclosure. The method includes the steps of: receiving, by an image sensor, light passing through a first aperture stop and a second aperture stop to generate an image frame (step S71); calculating a convolution of a first color subframe of the image frame respectively with a plurality of first blur kernels to generate a plurality of blurred first subframes (step S72); calculating a convolution of a second color subframe of the image frame respectively with a plurality of second blur kernels to generate a plurality of blurred second subframes (step S73); performing a best matching between the blurred first subframes and the blurred second subframes to obtain a set of best matching subframes (step S74); and obtaining a depth according to the set of best matching subframes (step S75), wherein the steps S72 to 75 are executed by the processor 65 using software and/or hardware, e.g., the function blocks shown in FIG. 5. Details of this embodiment have been illustrated above, and thus are not repeated hereinafter.

As mentioned above, to improve the accuracy of calculation, the operating method of this embodiment further includes: performing at least one of filtering (denoising) and lens shading compensation on the first color subframe and the second color subframe by a processor.

In addition, before processing the first color subframe and the second color subframe, the processor 65 performs an interpolation on pixel data of the first color pixels 651 and pixel data of the second color pixels 653 to respectively generate the first color subframe and the second color subframe. As mentioned above, the processor 65 digitizes gray values of the image frame F at first and then performs the interpolation.

It should be mentioned that the values, e.g., a size of pixel array, a number of blur kernels, a number of lenses and distances, described herein are only intended to illustrate but not to limit the present disclosure. In addition, the read circuit 63 is not limited to sequentially read every pixel of the pixel array 61 from a first pixel to a last pixel. It is also possible that pixel data of the first color pixels 651 is read at first and then pixel data of the second color pixels 653 is read without particular limitations.

In addition, corresponding to the turning on and off of a system light source, the processor 65 is able to calculate a differential image between a first image frame captured corresponding to the turning on of the system light source and a second image frame captured corresponding to the turning off of the system light source at first, and then perform the operating method of the ranging system mentioned above using the differential image frame. More specifically, it is possible to replace the image frame F in the above embodiments by a differential image but maintain other operations not being changed, and thus details thereof are not repeated herein.

As mentioned above, each of conventional ranging systems has different applicable limitations. Therefore, the present disclosure further provides a dual-aperture ranging system (FIGS. 1-6) and an operating method thereof (FIG. 7) that may calculate a depth map according to one image, the depth map including a plurality of depth values. Furthermore, as the present disclosure uses detection results of blue/green pixels but excludes detection results of red pixels, the interference from IR light is reduced so as to improve the detection accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A ranging system, comprising:
    a transparent plate on which an IR-cut filter layer having a first diaphragm aperture and al ht-shielding layer having a second diaphragm aperture are coated, wherein
        the second diaphragm aperture is larger than the first diaphragm aperture, and
        the light-shielding layer is firstly coated on the transparent plate and the IR-cut filter layer covers on the light-shielding layer and a part of the transparent plate; and
    a pixel array
        composed of IR pixels and green pixels without having any red pixel, or composed of IR pixels and blue pixels without having any red pixel, and configured to receive light passing through the transparent plate.

2. The ranging system as claimed in claim 1, wherein a cutoff wavelength of IR-cut filter layer is between 550 nm and 650 nm.

3. The ranging system as claimed in claim 1, further comprising a processor configured to
    divide an image frame outputted by the pixel array into a first color subframe and a second color subframe, wherein the first color subframe and the second color subframe have only a part of pixels of the image frame;
    respectively calculate a convolution of the first color subframe of the image frame outputted by the pixel array and a plurality of first blur kernels to generate a plurality of blurred first subframes;
    respectively calculate a convolution of the second color subframe of the image frame and a plurality of second blur kernels to generate a plurality of blurred second subframes; and
    compare the blurred first subframes and the corresponding blurred second subframes to obtain a pair of best matching subframes.

4. The ranging system as claimed in claim 3, wherein the comparison comprises a subtraction operation or a correlation between one of the blurred first subframes and the corresponding blurred second subframe.

5. The ranging system as claimed in claim 3, wherein the processor is further configured to perform at least one of filtering and lens shading compensation on the first color subframe and the second color subframe.

6. The ranging system as claimed in claim 3, wherein the processor is further configured to perform an interpolation on the image frame to generate the first color subframe and the second color subframe.

7. The ranging system as claimed in claim 3, wherein the processor further comprises a storage unit configured to store the first blur kernels, the second blur kernels and depth data corresponding to the first blur kernels and the second blur kernels.

8. The ranging system as claimed in claim 1, wherein the ranging system further comprises a lens holder configured to dispose the transparent plate, and the lens holder has an accommodation space for accommodating the pixel array.

9. The ranging system as claimed in claim 8, wherein the ranging system further comprises an IR-cut filter between the transparent plate and the pixel array, and a cutoff wavelength of the IR-cut filter is 810 nm.

10. A ranging system, comprising:
    a light source;
    a transparent plate on which an IR-cut filter layer having a first diaphragm aperture and a light-shielding layer having a second diaphragm aperture are coated, wherein
        the second diaphragm aperture is larger than the first diaphragm aperture, and
        the light-shielding layer is firstly coated on the transparent plate and the IR-cut filter layer covers on the light-shielding layer and a part of the transparent plate;
    an image sensor comprising a pixel array composed of IR pixels and green pixels without having any red pixel, or composed of IR pixels and blue pixels without having any red pixel, and the image sensor configured to receive light passing through the transparent plate, output a first image frame corresponding to the light source being turned on and output a second image frame corresponding to the light source being turned off; and
    a processor configured to calculate a differential image frame between the first image frame and the second image frame, divide the differential image frame into a first color subframe and a second color subframe;

respectively calculate a convolution of the first color subframe and a plurality of first blur kernels to generate a plurality of blurred first subframes;

respectively calculate a convolution of the second color subframe and a plurality of second blur kernels to generate a plurality of blurred second subframes; and perform a best matching between the blurred first subframes and the blurred second subframes to obtain a set of best matching subframes.

11. The ranging system as claimed in claim 10, wherein the first color is green light or blue light, and the second color is infrared light.

12. The ranging system as claimed in claim 10, wherein the best matching comprises a subtraction operation or a correlation between each of the blurred first subframes and the corresponding blurred second subframe.

13. The ranging system as claimed in claim 10, wherein the processor is further configured to determine a depth according to depth information of at least one of the first blur kernels and the second blur kernels corresponding to the set of best matching subframes.

14. The ranging system as claimed in claim 10, wherein the processor is further configured to perform at least one of filtering and lens shading compensation on the first color subframe and the second color subframe.

15. The ranging system as claimed in claim 10, wherein the processor is further configured to perform an interpolation on the differential image frame to generate the first color subframe and the second color subframe.

16. An operating method of a ranging system, the ranging system comprising a transparent plate and an image sensor sequentially arranged in a longitudinal direction, the transparent plate being coated with an IR-cut filter layer having a first diaphragm aperture and a light-shielding layer having a second diaphragm aperture larger than the first diaphragm aperture, wherein the light-shielding layer is firstly coated on the transparent plate and the IR-cut filter layer covers on the light-shielding layer and a part of the transparent plate, the operating method comprising:

receiving, by the image sensor comprising a pixel array composed of IR pixels and green pixels without having any red pixel, or composed of IR pixels and blue pixels without having any red pixel, light passing through the transparent plate to generate an image frame;

calculating a convolution of a first color subframe of the image frame respectively with a plurality of first blur kernels to generate a plurality of blurred first subframes;

calculating a convolution of a second color subframe of the image frame respectively with a plurality of second blur kernels to generate a plurality of blurred second subframes;

performing a best matching between the blurred first subframes and the blurred second subframes to obtain a set of best matching subframes; and obtaining a depth according to the set of best matching subframes.

17. The operating method as claimed in claim 16, further comprising:

performing at least one of filtering and lens shading compensation on the first color subframe and the second color subframe.

18. The operating method as claimed in claim 16, further comprising:

performing an interpolation on the image frame to generate the first color subframe and the second color subframe.

19. The operating method as claimed in claim 16, wherein the best matching comprises a subtraction operation or a correlation between each of the blurred first subframes and the corresponding blurred second subframe.

20. The ranging system as claimed in claim 16, wherein the first color is green light or blue light, and the second color is infrared light.

* * * * *